United States Patent [19]

Casillo et al.

[11] Patent Number: 5,543,001
[45] Date of Patent: Aug. 6, 1996

[54] METHOD FOR THE PLACEMENT OF SELF-ADHESIVE LABELS ON COMPACT DISKS

[75] Inventors: Joseph Casillo, Hamden; Frederick M. Johnson, Higganum; John M. Heath, Jr., Hamden; Gregory R. Veilleux, Wallingford; William J. Dufault, West Haven, all of Conn.

[73] Assignee: Micropatent, East Haven, Conn.

[21] Appl. No.: 410,239

[22] Filed: Mar. 24, 1995

Related U.S. Application Data

[63] Continuation-in-part of Ser. No. 287,153, Aug. 8, 1994, abandoned.

[51] Int. Cl.⁶ .............................. B32B 31/04; G11B 7/00
[52] U.S. Cl. ................ 156/60; 156/DIG. 1; 156/DIG. 2; 283/81; 29/271; 29/464; 269/47
[58] Field of Search ...................... 156/DIG. 1, DIG. 2, 156/247; 283/81; 209/47, 909; 264/107; 369/14, 58; 29/271

[56] References Cited

U.S. PATENT DOCUMENTS

| | | | |
|---|---|---|---|
| 1,500,698 | 7/1924 | Wiehl | 264/107 |
| 3,687,769 | 8/1972 | Dague | 264/107 |
| 4,213,927 | 7/1980 | Alberti | 264/107 |
| 4,385,460 | 5/1983 | Hanna . | |
| 4,903,255 | 2/1990 | Sugaya et al. . | |
| 5,084,127 | 1/1992 | Nakamura . | |
| 5,316,454 | 5/1994 | Lexell . | |
| 5,346,654 | 7/1994 | Kodaka et al. | 564/107 |

*Primary Examiner*—Michael W. Ball
*Assistant Examiner*—Sam Chuan Yao
*Attorney, Agent, or Firm*—Bachman & Lapointe, P.C.

[57] ABSTRACT

A labeler for the placement of self-adhesive labels onto compact disks, having a positioning cone with a cylindrical extension, a flat surface with a diameter greater than that of the cylindrical extension, and a tapered end opposite the cylindrical extension, a positioning plate having a central positioning hole, and a surface upon which a self-adhesive label can be placed, and a base supporting the positioning plate, having a hollow space below the positioning plate. A method for affixing a label to a compact disk using the labeler is provided, including the steps of providing a positioning member having a guide, a stock corresponding in shape to the central aperture of the label and a disk locating member, the stock being between the guide and the disk locating member, and providing a positioning plate having an aperture and a surface, the positioning plate aperture being adapted for receiving the stock of the positioning member, the guide centering the positioning member in the positioning plate aperture during insertion, placing the label adjacent to the surface with the label aperture overlapping the positioning plate aperture, inserting the guide and the stock of the positioning member through the label aperture and through the positioning plate aperture, allowing the stock of the positioning member to position the label in fixed relation to the disk locating member, and compressing the disk, located by the disk locating member, and the surface, with the positioned label therebetween.

6 Claims, 2 Drawing Sheets

METHOD FOR THE PLACEMENT OF SELF-ADHESIVE LABELS ON COMPACT DISKS

CROSS-REFERENCE TO RELATED CASES

This is a continuation-in-part of U.S. Ser. No. 08/287,153, filed Aug. 8, 1994, now abandoned, to a Labeler and Method for Near Perfect Manual Placement of Self-Adhesive Labels Onto Compact Disks.

FIELD OF THE INVENTION

This invention relates generally to apparatus and methods for the placement of adhesive labels onto flat objects, and more specifically to an apparatus and method for the concentric placement of self-adhesive labels onto compact disks.

BACKGROUND OF THE INVENTION

The proliferation of compact disks (discs), also known as laser disks, in the form of music as well as CD-ROM products has become extensive. In recent years, recordable compact disks such as those produced by SONY, 3M, and KODAK have grown in popularity. Further, these disks are being used for archival data storage, immediate distribution of data, and for demonstration purposes. With this recent use has grown a need to label these disks once they have been produced. This is because once produced, there is no apparent visual method for determining the contents of a disk, which may contain 680 MB of data or more. While manufacturers of large numbers of identical disks have their labels or identifying information painted or printed onto the disks, e.g., a layer of ink or pigment which adheres to the surface of the disk is applied, this method is entirely impractical for recordable compact disk producers. For small runs or those requiring immediate availability of the disk, printing or painting based methods of labelling take too much time, incur a significant setup charge, and require special equipment.

Another known method of labelling a compact disk employs a direct printing using an ink jet system onto the surface of a disk. These systems provide a special carrier for the disk, which is printed using a conventional ink jet printing apparatus. This method suffers the shortcomings of ink jet technology, including problems with the inks used, such as smudging, running, lack of scratch resistance on the disk surface, and the like.

Ink markers may also be used to label disks, but this is unattractive and can cause damage to the disk by breaking down the coating which protects the disk. Permanent ink markers often include solvents in the ink. As a result, manufacturers such as Avery Dennison, Avery Division, Diamond Bar, Cal., have begun producing self-adhesive labels shaped like and designed for compact disks. Unfortunately there is no available method or apparatus for the accurate placement of these labels on compact disks, despite the fact that an incorrect placement is unsightly and may result in damage to the motor of the compact disk player device by unbalancing the disk and causing uneven spinning.

SUMMARY AND OBJECTS OF THE INVENTION

The present invention provides an apparatus and method for the accurate placement of labels onto compact disks or other objects. This apparatus employs a localization device for the label, and a localization device for the object, wherein the localization devices have a fixed relation between one another so that after the label and object are localized, they may be brought into intimate contact and adhered together in a desired manner having a predetermined relationship. In general, for labelling compact disks, only a concentricity of the label with the disk need be assured, so that the label and disk need not be rotationally aligned. It is noted that the compact disk has a central aperture, and therefore the label must also have a central aperture. These central apertures provide an opportunity for aligning the central axes of the label and disk with each other, which is exploited by a preferred embodiment of the present invention. Further, an inner margin of the disk is preferably not covered by any label in order to assure proper linkage with the compact disk drive. Therefore, the central aperture of the label is preferably larger than the central aperture of the compact disk.

One problem with self-adhesive labels is that they are unforgiving. Once placed in intimate contact with a disk or other object, they will adhere and be extremely difficult to remove. Thus, the localization device must not make substantial surface contact with the label. Further, the disk and the label must be maintained separated during the labelling process until the proper alignment is achieved, and only then are the disk and label placed in intimate contact. Of course, this labelling may also be automated, using an apparatus according to the present invention. The self-adhesive label will not adhere firmly to a release agent treated surface, such as the backing of the label. Therefore, it may be advantageous to treat the labelling apparatus with such a release compound, e.g., a silicone compound, in order to prevent inadvertent adhesion.

When separated from the backing, the labels tend to curl, especially if the backing is held flat and the label is pulled back at an angle, bending the label. Therefore, it is preferred that the label be held flat during backing removal and the backing flexed. Another concern is the potential generation of a static electrical charge caused by separation of the label and the backing. This static may be dissipated by providing a conductive surface for the label to lay on prior to use, an ion generator static eliminator, a humidifier or other known means. Alternatively, this static charge may be advantageously employed to hold the label in a desired position. Therefore, the apparatus may include a high voltage, low power generator which creates a charge opposite the induced charge on the label, so that the charge causes the label to lay flat. Such a charge may be generated by a miniature Van de Graff generator, inductive high voltage power supply, capacitive voltage multiplier, or by creating a friction induced static charge on the surface of the apparatus before the label is placed on the surface.

A further method for maintaining the label flat during application is the use of an air pressure differential. In such an embodiment, a low pressure chamber may be present below the surface where the label is placed. Small holes in the surface will hold the label flat against the surface during application. A pressure may also be applied from above the porous surface, such as by means of a piston in cylinder, which may include the disk to be labelled as a part of the piston. Further, a stream of air may allow the Bernoulli effect to be used to hold the label adjacent the disk. In the event that a vacuum or pressure is maintained, a battery operated pump or fan may be used, with the batteries and electromechanical elements in the base of the labeler. An optical sensor may be employed in order to detect the presence of a label and activate the system.

A further method of holding the label adjacent to the surface is to provide a slightly tacky substance on the surface which will gently adhere the label. In this case, the label including backing may be placed on the surface, and the backing removed while the label is held in place.

Where electrical mechanisms are employed, e.g., motors, pumps, power supplies, it is preferred that the system be powered by batteries, e.g., AA, C or D alkaline cells. Rechargeable and other primary batteries, such as nickel cadmium, nickel metal hydride, lithium ion, zinc air and other known chemistries may also be used.

The apparatus includes a surface for applying a force between the label and the object to be labelled. In the case of a flat disk, the surface will also be flat; however, if an object having a more complex surface is to be labelled, the surface of the apparatus should conform to the surface of the object, allowing for the thickness of the label.

The label has generally a central circular hole, larger than the central aperture in the disk, so that no clearance problems will arise. Thus, a member within this central circular hole which has a largest dimension approximately equal to the diameter of the hole, will locate the label. This member is preferably a conical tipped cylinder, which provides an initial conical taper so that the tip may be easily guided into the hole. Further insertion will gently relocate the label with respect to the member, until the label is concentric around the cylindrical portion of the member. Since the label is placed on the surface, the surface generally also has an aperture of the same size as the label, so that the localization device may pass through both.

The disk has a central aperture, smaller than the hole in the label. Thus, the localization system for the disk also need include a member having a maximum width approximately equal to the diameter of the hole, with a small amount clearance. Because the disk is rigid and easy to handle, no taper is necessary in order to place the disk on the localization system, which may be, for example, a cylindrical rod. Advantageously, the localization system for the disk has a stop to limit the distal position of the disk on the disk localization system. e.g., the cylindrical rod, to prevent the disk from slipping off after being mounted. A second stop may also be placed above the disk after mounting so that the disk is fixed with respect to the localization system, although this is not required.

The configuration of the disk and label, each being localized by a different diameter coaxial cylindrical member, provides an opportunity for these localization systems to be formed as an integral unit, with the shoulder of the larger diameter cylinder serving as the stop for the disk. Thus, the disk is localized on the smaller diameter cylinder, and the tapered portion of the larger diameter cylinder is inserted through the label, adhesive side up, supported by the surface, and through an aperture in the surface.

Thus, the label is centered by the conical taper and the larger diameter cylinder with respect to the disk. The larger diameter cylinder is insertable through the label and the aperture in the surface. When the junction between the larger and smaller diameter cylinders is reached, the disk lies nearly adjacent to the label, properly positioned. Pressure may then applied on top of the disk, by any suitable means, including manual pressure, pressure on a pressure plate, an automatic pressure device, a spring or weight, or other known means, forcing intimate contact between the label and the disk, thus adhering the two.

The labeler may be used in the following manner. An orienting apparatus is provided in which a positioning plate is provided on top of a cylindrical base, having a hollow core region under the positioning plate. The positioning plate has a central aperture. Preferably, the base is placed on a substantially flat surface, although this is not necessary. A compact disk shaped adhesive label, having an inner diameter larger than the central core area of the compact disk and an outer diameter smaller than the compact disk is placed onto a surface area of the positioning plate with the adhesive side of the label facing away from the positioning plate. The label is positioned so that its center hole area is approximately over a positioning hole in the positioning plate, with at least a small overlapping portion. Thereafter, the compact disk is placed onto a cylindrical extension of a positioning cone with the readable side of the compact disk facing away from the cone, by placing the cylindrical extension through a center hole in the compact disk so that a center area of the compact disk is resting upon a flat surface of the cone. The compact disk is then lowered onto the label by inserting the positioning cone through overlapping portion of the center hole area of the self-adhesive label and the positioning hole in the positioning plate, and into the hollow core portion of the cylindrical base, below the positioning plate. A force is then applied between the compact disk and the label to affix the label to the disk.

The compact disk with the newly affixed label is then removed from the device by lifting the cylindrical extension and pulling the positioning cone out of the positioning hole and the hollow core portion. Thereafter, the compact disk is lifted off the cylindrical extension. If not permanently affixed, the positioning plate may be removed from the cylindrical base and used to further press the label onto the compact disk. This last step is carried out by placing the positioning plate on top of the compact disk and manually pressing the plate against the disk while the disk is lying on a substantially flat surface. A separate pressure plate may be provided, or another compact disk employed in order to compress the label.

The preferred materials for construction of the apparatus are plexiglass or acrylic plastic. These may be transparent, providing a decorative appearance in addition to the functional attributes. Of course, the apparatus may also be constructed of wood, glass, metal, other types of plastic, ceramic, composite materials or other known of materials. In general, the material selection is not critical to the functionality, so long as the device supports the weight of itself, the label and disk, as well as withstands the force applied to adhere the disk to the label. In addition, it is preferred that the device be made of a soft material which reduces the risk or scratching or marring the surface of the disk. Plexiglass may be fabricated by machining, by gluing or by other means, such as ultrasonic welding, as known in the art. Other materials may be fabricated into the labelling apparatus by known means.

It is therefore an object according to the present invention to provide a labelling apparatus and method for coaxially orienting an adhesive label and a flat object before contacting them, so that the label is positioned properly when an adhering pressure is applied.

It is another object of the present invention to provide a labeler for the accurate placement of pre-made and self-adhesive labels onto compact disks with limited bubbling.

It is a still further object of the present invention to provide a labeler for the near perfect placement of pre-made and self-adhesive labels onto compact disks without damaging the compact disks.

It is an object according to the present invention to provide an apparatus for applying a label, having an aperture, to a disk, comprising a positioning member having a guide, a stock corresponding in shape to the aperture of the label and a disk locating member, the stock being between the guide and the disk locating member, and a positioning plate having an aperture and a surface, the positioning plate aperture being adapted for receiving the stock of the positioning member, the guide centering the positioning member in the positioning plate aperture upon insertion of the guide in the positioning plate aperture, the label being positioned in relation to the disk locating member by insertion of the guide and the stock into the label aperture and the positioning plate aperture, the disk locating member and the surface being arranged so that a mutual compression of the disk and the positioning plate with the label therebetween urges the label to be immediately adjacent the disk.

It is also an object according to the present invention to provide a method for applying a label having a central aperture to a disk, comprising the steps of providing a positioning member having a guide, a stock corresponding in shape to the central aperture of the label and a disk locating member, the stock being between the guide and the disk locating member, and providing a positioning plate having an aperture and a surface, the positioning plate aperture being adapted for receiving the stock of the positioning member, the guide centering the positioning member in the positioning plate aperture during insertion, placing the label adjacent to the surface with the label aperture overlapping the positioning plate aperture, inserting the guide and the stock of the positioning member through the label aperture and through the positioning plate aperture, allowing the stock of the positioning member to position the label in fixed relation to the disk locating member, and compressing the disk, located by the disk locating member, and the surface, with the positioned label therebetween.

It is a still further object according to the present invention to provide a labelled disk formed by the process of providing a positioning member having a guide, a stock corresponding in shape to the central aperture of the label and a disk locating member, the stock being between the guide and the disk locating member, and providing a positioning plate having an aperture and a surface, the positioning plate aperture being adapted for receiving the stock of the positioning member, the guide centering the positioning member in the positioning plate aperture during insertion, placing a label, having an aperture, adjacent to the surface with the label aperture overlapping the positioning plate aperture, inserting the guide and the stock of the positioning member through the label aperture and through the positioning plate aperture, allowing the stock of the positioning member to position the label in fixed relation to the disk locating member, and compressing a disk, located by the disk locating member, and the surface, with the positioned label therebetween.

It is a still further object according to a preferred embodiment of the present invention to provide a labeler for the near-perfect manual placement of self-adhesive labels onto compact disks comprising a positioning cone with an elongated stock, a flat surface on a portion of the elongated stock opposite the positioning cone, and an extension from the flat surface; a positioning plate with a positioning hole in its center, a surface area upon which a self-adhesive label can be placed; and a cylindrical base supporting the positioning plate, having a hollow core portion below the positioning plate, into which a substantial portion of the positioning cone can fit. The extension from the flat surface preferably fits substantially snugly in a center hole of a compact disk and provides for ease of removal of the compact disk from the extension, and is preferably sufficiently long enough for used as a handle. The positioning plate preferably has a diameter which is slightly larger than the diameter of a compact disk, preferably with the positioning hole located substantially in the center of the positioning plate, having substantially the same diameter as the center area, i.e., inner limit of information recording, of a compact disk. According to a preferred embodiment, the positioning plate fits substantially flat on top of the cylindrical base.

It is also an object according to a preferred embodiment of the present invention to provide a method for the near-perfect manual placement of self-adhesive labels onto compact disks comprising steps of providing a base, having an upper surface, an aperture and a space below the upper surface, the base preferably being cylindrical and the surface preferably being flat; placing a compact disk shaped self-adhesive label onto the surface with an adhesive side of the label facing away from the surface in a manner which positions the self-adhesive label so that a center hole area of the self-adhesive label is overlapping the aperture; placing the compact disk onto a dowel, coaxially extending from a distally tapered cylinder with the readable side of the compact disk facing away from the cylinder by placing the dowel through a center hole of the compact disk so that a center area of the compact disk is resting upon a flat surface of the cylinder; lowering the compact disk onto the self-adhesive label by inserting the distal taper through the aperture of the self-adhesive label and the aperture of the surface and into the space; and applying a force to the compact disk to affix the self adhesive label to the compact disk.

These and other objects of this invention will become more apparent from the following description and accompanying drawings in which like reference numerals depict like elements.

Other details of the labeler and the method of the present invention are set out in the following description.

BRIEF DESCRIPTION OF THE DRAWING

The preferred embodiments of the invention will now be described with respect to the drawings.

DETAILED DESCRIPTION OF THE PREFERRED EMBODIMENTS

EXAMPLE 1

Figure 1:
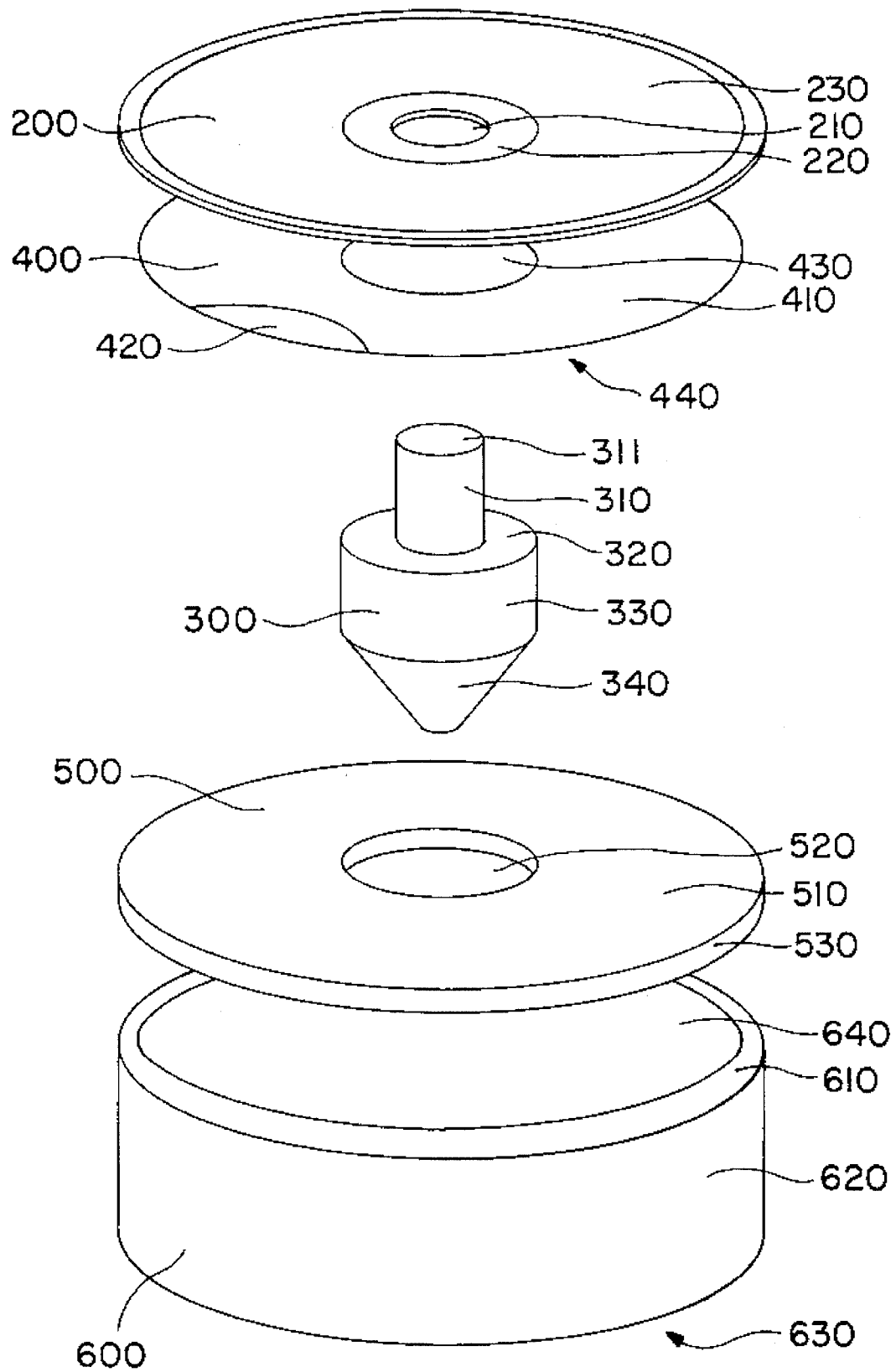
FIG. 1 is an exploded view of a labeling device in accordance with the present invention.

Referring now to FIG. 1, a compact disk labeler is illustrated which provides for the placement of self adhesive labels 400 onto compact disks 200. The labeler includes a base unit 600 having a positioning plate 500, and a positioning cone 300.

Compact disk 200 has a center hole 210, a medium surface 230, having an area containing optically readable data, a center area 220 inside an area of data medium surface 230, and an outer edge 240 which does not contain optically readable data. Standard compact disks 200 have a diameter of 12 centimeters, although the present labeler is adaptable for disks of other sizes and configurations, e.g., mini compact disks having a diameter of about 5 cm and full size optical disks having a diameter of about 25 cm. A center hole 210 of the compact disk has a diameter of about 1.5 centimeters. The center area 220 of the compact disk has a diameter of about 4 centimeters, and the outer edge 240 is about 1 millimeter wide. Single sided compact disk 200 has a side which can be covered with a label and a side which cannot be covered so as to allow the information stored upon the compact disk to be accessed. The difference between the different sides of a compact disk 200 as well as the general design of compact disks 200 are well known to those skilled in the art.

The labeler includes a positioning cone 300. Positioning cone 300 is formed of clear acrylic. Protruding from positioning cone 300 is a cylindrical extension 310. Cylindrical extension 310 is adapted to fit inside the center hole 210 of compact disk 200. The cylindrical extension has a small clearance fit with the wall of the center hole 210, so as to provide easy insertion and removal of the cylindrical extension 310 from the center hole 210 of compact disk 200 and to ensure that compact disk 200 will be accurately aligned while it is around the cylindrical extension 310. Preferably, the diameter of the elongated stock 310 will be about 0.5 millimeters less than the diameter of center hole 210, although other diameters may also be suitable. Cylindrical extension 310 is also preferably long enough so as to provide easy gripping by the user. The cylindrical extension 310 is preferably about 2.5 to 5 cm long from the tip 311 to where it attaches to flat surface 320.

Flat surface 320 is provided to stop the compact disk 200 from moving any further down cylindrical extension 310 toward the positioning cone 300. Flat surface 320 is integrally linked to cylindrical extension 310 and body member 330. Body member 330 merges with tapered portion 340, which terminates as a small radius or flat surface of about 1 centimeter diameter. Tapered portion 340 is designed to facilitate the easy penetration and exit of positioning cone 300 into and through positioning hole 520 in positioning plate 500. The configuration of positioning cone 300 is therefore similar to a classic spinning top, although the tapered portion 340 need not have low friction at its terminus for free spinning. The diameter of flat surface 320 is approximately the same as the diameter of the center area 220 of compact disk 200, e.g., about 4 centimeters, and therefore greater than that of the elongated stock, e.g., about 1 centimeter. When compact disk 200 is placed upon cylindrical extension 310 by placing tapered portion 311 into center hole 210, the compact disk 200 will rest against the flat surface 320. The cylindrical extension 310 is coaxial with the positioning cone 300, so that if the compact disk 200 and positioning cone 300 were observed by looking at the point 340 with elongated stock 310 positioned away from the observer, that all of the compact disk 200 would be visible except for center hole 210 and center area 220. Thus, visual confirmation may be obtained of the correct configuration.

A self-adhesive label 400 is designed to fit onto the top of a compact disk 200 so as to allow for easy identification of the information provided upon compact disk 200. Self-adhesive label 400 has a writing surface 410 upon which text can be printed using a laser printer, ink jet printer, pen, typewriter or other writing means. The self-adhesive label is preferably printed prior to labelling of the compact disk 200. Self-adhesive labels are produced to fit onto compact disk 200, covering all or most of the non-readable side of the compact disk 200 except for the center hole 210, the center area 220, and the outer edge 240. On the opposite side of self-adhesive label 400 from writing surface 410 is adhesive side 420. Adhesive side 420 is typically covered with an adhesive which releases easily from a backing and allows the self-adhesive label 400 to be permanently attached to most other untreated surfaces. Self-adhesive label 400 typically has a hole area 430 where there is no label material, and which leaves self-adhesive label 400 having a flat doughnut configuration. Normally, the label is provided as a circular label on a backing sheet, with an inscribed center hole which may easily be detached from the outer label portion. Hole area 430 will typically correspond to and have a similar, if not exact, diameter to that of center area 220 of compact disk 200. Such self- adhesive labels 400 are typically manufactured from paper, TYVEK, vinyl or any other material suitable for labeling. Such self-adhesive labels 400 are well known to those skilled in the art.

A positioning plate 500 is illustrated. Positioning plate 500 has a positioning hole 520, a top area 510, and a side area 530. Positioning hole 520 is located substantially in the center of the plate 500 and is designed to allow positioning cone 300 to slide through it. Ideally, positioning hole 520 will have a diameter about 0.5 millimeters larger than positioning hole 300. Additionally, the diameter of the positioning hole is substantially the same as the diameter of the center area of the compact disk. Thus, the center hole of the label 430, the positioning hole 520 of the positioning plate 500 and the center area of the compact disk all have a diameter of about 4 centimeters, with slight variation. The diameter of positioning hole 520 is designed so as to allow positioning cone 300 to easily penetrate and exit position hole 520, while avoiding side to side movement.

Surface area 510 is designed so that a compact disk 200 can rest upon it without extending over its edges. Preferably, surface area 510 will have a diameter about 1 centimeter larger than the diameter of compact disk 200. The larger diameter is provided to facilitate a flat surface so that self-adhesive labels 400 can be placed upon compact disks 200 with minimum bubbling, and to allow initial imprecise placement of the label which is then corrected by the positioning cone.

The side area 530 is the thickness of the positioning plate 500, and provides thickness and strength. As such, side area 530 is preferably wide enough to limit the flexibility of the positioning plate 500. Positioning plate 500 is preferably formed of clear acrylic sheet, attached to the cylindrical base 600. Positioning plate 500 may be covered with a soft material such as, but not limited to, flannel so as to avoid scratching the compact disk 200. The covering may also be an antistatic material.

Cylindrical base 600 has a flat lip member 610, a flat bottom 630, a wall 620 and a hollow space 640. Flat lip member 610 supports the positioning plate 500 to rest flatly on top of it, and may be glued or fused together. Therefore, flat lip member 610 preferably has an inner diameter which is smaller than that of positioning plate 500 so that positioning plate 500 is stably supported by cylindrical base 600. The positioning plate may also be within the cylindrical base member and supported at the inner surface of the cylindrical base 600.

Wall 620 spaces flat lip member 610 from a lower portion of the base 600, preferably at a height which will allow positioning cone 300 to pass through positioning hole 520 of the positioning plate 500 so that if positioning cone 300 were to enter with point 340 first, all of the positioning cone 300 except for elongated stock 310, could fit below the level of flat lip member 610.

Flat bottom 630 is preferably flat so that cylindrical base 600 will sit stably on a table top or other surface.

Hollow space 640 must merely be large enough to allow positioning cone 300 to fit within the hollow space 640, if the positioning cone 300 were to enter with tapered terminus 340 first, and all of the positioning cone 300, except for elongated stock 310, were to fit below the level of flat lip member 610.

It has been found that an empty filter housing (the structure in which a person places both a coffee filter and coffee grounds) may be adapted for use as cylindrical base 600, although the preferred cylindrical base is formed of an acrylic cylinder.

EXAMPLE 2

In use, the positioning plate 500 is provided on top of cylindrical base 600, with the positioning plate 500 in contact with flat lip member 610, preferably affixed thereto. The flat bottom 630 is supported by an external surface, such as a table top or other desired flat surface. Then, the self-adhesive label 400 is placed onto surface area 510 of positioning plate 500, with adhesive side 420 facing up and away from positioning plate 500. Self-adhesive label 400 is placed on positioning plate 500 in a manner which positions self-adhesive label 400 so that hole area 430 is overlapping the positioning hole 520. As such, an observer should be able to see through self-adhesive label 400 and positioning plate 500 and into cylindrical base 600. Then compact disk 200 is placed onto positioning cone 300 by placing elongated stock 310 through center hole 210, so that center area 220 of compact disk 200 is resting upon flat surface 320. The compact disk 200 on the cylindrical extension 310 is then lowered onto the self-adhesive label 400 by inserting positioning cone 300, with the tapered portion 340 entering first, through hole area 430 and positioning hole 520, and into hollow space 640 of base 600. As compact disk 200 comes to rest upon self-adhesive label 400, which is supported by positioning plate 500, compact disk 200 will separate from flat surface 320, while still remaining on cylindrical extension 310. In this manner, self-adhesive label 400 is secured onto compact disk 200 so that the label will cover substantially all of the non-readable side of the compact disk 200 except for the center hole 210, the center area 220 and the outer edge 240. Pressing with, e.g., the user's fingers, further facilitates proper adhesion, and eliminates any trapped air bubbles under the label.

The compact disk 200 is lifted with its newly affixed self-adhesive label 400 by lifting cylindrical extension 310 and pulling positioning cone 300 out of both positioning hole 520 and hollow space 640. Compact disk 200 is then removed from cylindrical extension 300 by lifting compact disk 200 off of cylindrical extension 310. When the positioning plate is removable from the cylindrical base, the positioning plate 500 may then be removed from base 600, and while laying compact disk 200 on a flat surface, which may be covered with a soft material such as a cotton towel, and the self-adhesive label 400 is pressed further onto compact disk 200, by placing positioning plate 500 on top of compact disk 200 and then pressing.

The method produces a compact disk with a label affixed near-perfectly and with limited bubbles.

EXAMPLE 3

Figure 2:
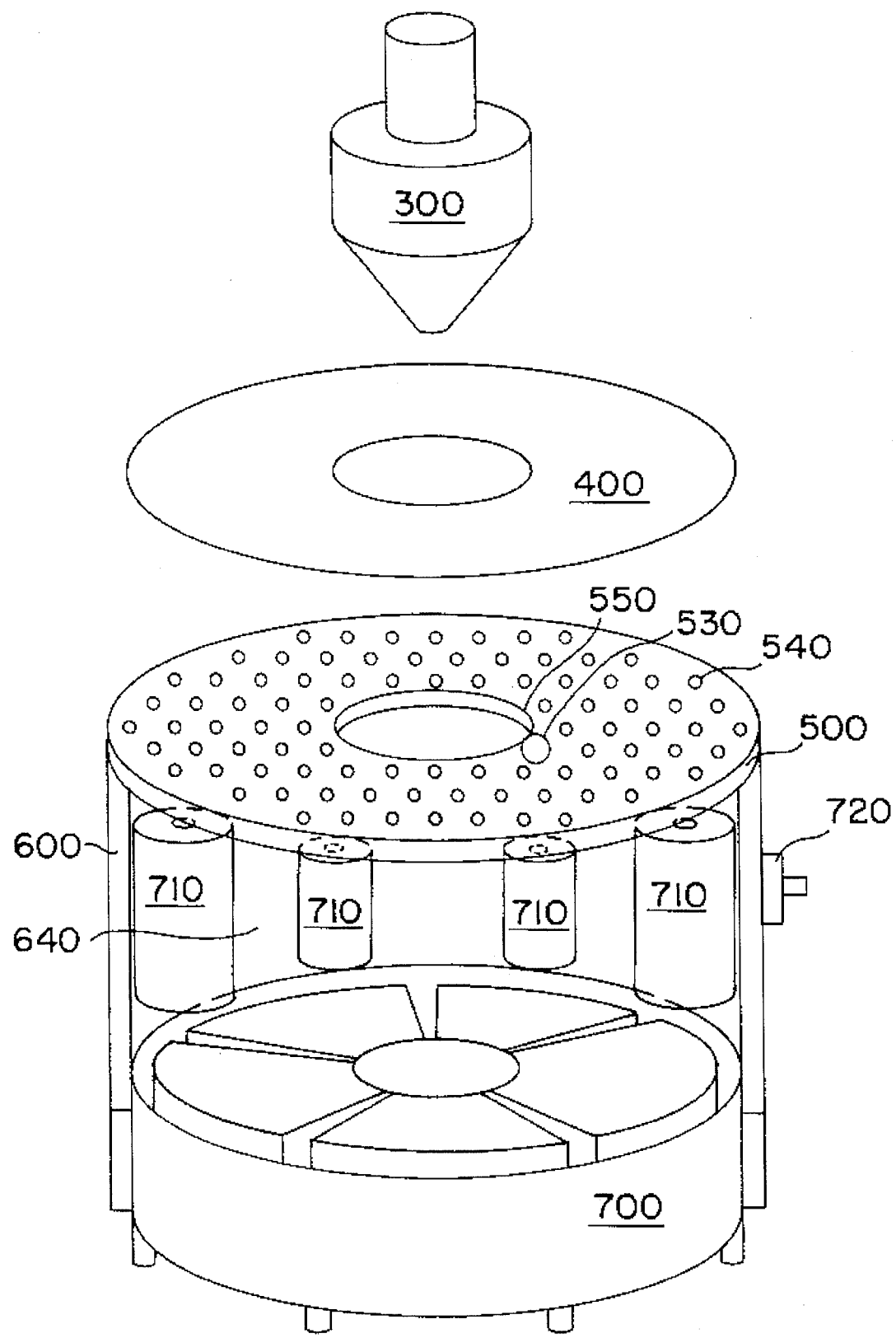
FIG. 2 illustrates an alternative embodiment of the labeling device of the present invention.

Referring now to FIG. 2, a labeler is provided generally in accordance with the embodiments of Examples 1 and 2. The positioning plate 500 has a plurality of evenly spaced small holes 540, e.g., 0.5 mm diameter holes in a hexagonal array on 1.0 centimeter centers. A 6 volt muffin type fan 700 is provided in the base 600, which exhausts out of the base 600 to draw a partial vacuum in the hollow space 640. Thus, a flow is directed inward through the holes 540, which will draw the label 400 toward the positioning plate 500. The inner edge of the positioning hole is provided with an "O" ring 550 to seal around the positioning cone 300, which has a smooth surface.

The muffin fan 700 is driven by 4 D-type alkaline cells 710, which are arranged inside the base 600. An on-off switch 720 is provided on a side of the base. Alternately, a switch 730 may be provided in cooperation with the O-ring 550, which activates the muffin fan 700 when the positioning cone is inserted.

It should be understood that the preferred embodiments and examples described herein are for illustrative purposes only and are not to be construed as limiting the scope of the present invention, which is properly delineated only in the appended claims.

What is claimed is:

1. A method for the placement of labels onto compact disks comprising the following steps:
   a) providing a base having a surface, a positioning hole and a hollow space beneath the surface;
   b) placing a label having a hole onto the surface such that the hole of the label overlaps the positioning hole;
   c) providing a disk locating device having an extension adapted for insertion in a compact disk on one side and a tapered member on another side and a stop between the sides;
   d) placing the compact disk onto the disk locating device extension limited by the stop; and
   e) pressing the compact disk against the self-adhesive label by inserting the tapered member through the hole area of the label and the positioning hole of the surface, and into the hollow space of the base, thereby contacting the compact disk and the label.

2. The method according to claim 1, further comprising the steps of:
   g) lifting the compact disk with the label affixed thereto from the extension; and
   h) pulling the tapered member out of the positioning hole of the surface and the hollow space of the base.

3. A method for applying a label having a central aperture to a disk, comprising the steps of:
   (a) providing:
      a positioning member having a guide, a stock corresponding in shape to the central aperture of the label, and a disk locating member, the stock being located between the guide and the disk locating member; and
      providing a positioning plate having an aperture and a surface, the positioning plate aperture being adapted for receiving the stock of the positioning member, the guide centering the positioning member in the positioning plate aperture during insertion;
   (b) placing the label adjacent to the surface with the label aperture overlapping the positioning plate aperture;
   (c) inserting the guide and the stock of the positioning member through the label aperture and through the positioning plate aperture, allowing the stock of the positioning member to position the label in fixed relation to the disk locating member; and
   (d) compressing the disk, located by the disk locating member, and the surface, with the positioned label therebetween.

4. The method according to claim 3, wherein said positioning member providing step comprises providing a disk locating member which is a cylinder which fits snugly in a center hole of a compact disk.

5. The method according to claim 3, wherein said positioning member providing step comprises providing a guide which comprises a conical taper.

6. The method according to claim 3, wherein said positioning member providing step comprises providing an aperture which is circular and a guide which is cylindrical, each having a diameter approximately equal to a center area of a compact disk.

* * * * *